US009870542B2

(12) United States Patent
Kruempelmann et al.

(10) Patent No.: US 9,870,542 B2
(45) Date of Patent: Jan. 16, 2018

(54) MANAGING INFORMATION TECHNOLOGY SOLUTION CENTERS

(75) Inventors: Wulf Kruempelmann, Altlussheim (DE); Clemens Jacob, Mannheim (DE)

(73) Assignee: SAP SE, Walldorf (DE)

( * ) Notice: Subject to any disclaimer, the term of this patent is extended or adjusted under 35 U.S.C. 154(b) by 1074 days.

(21) Appl. No.: 13/299,146

(22) Filed: Nov. 17, 2011

(65) Prior Publication Data
US 2013/0132144 A1   May 23, 2013

(51) Int. Cl.
*G06Q 10/00* (2012.01)
*G06Q 10/06* (2012.01)
*G06Q 30/00* (2012.01)

(52) U.S. Cl.
CPC ....... *G06Q 10/06* (2013.01); *G06Q 10/06312* (2013.01); *G06Q 30/016* (2013.01)

(58) Field of Classification Search
CPC ................ G06Q 10/06312; G06Q 30/016
USPC ................................ 705/7.22, 304
See application file for complete search history.

(56) References Cited

U.S. PATENT DOCUMENTS

| | | | |
|---|---|---|---|
| 6,868,427 B2 | 3/2005 | Herzog et al. | |
| 7,885,842 B1 * | 2/2011 | Bartolini et al. | 709/226 |
| 2005/0159969 A1 * | 7/2005 | Sheppard | 705/1 |
| 2005/0228878 A1 * | 10/2005 | Anstey et al. | 709/224 |
| 2007/0168874 A1 * | 7/2007 | Kloeffer et al. | 715/764 |
| 2007/0233865 A1 * | 10/2007 | Garbow et al. | 709/226 |
| 2007/0294406 A1 * | 12/2007 | Suer et al. | 709/226 |
| 2008/0008085 A1 * | 1/2008 | Gerstel | 370/216 |
| 2009/0070770 A1 * | 3/2009 | Gasca et al. | 718/104 |
| 2010/0131315 A1 * | 5/2010 | Gilbert et al. | 705/7 |
| 2010/0274616 A1 * | 10/2010 | Grace et al. | 705/9 |

OTHER PUBLICATIONS

"SAP Solution Manager for End-to-End Operations," [online], Apr. 15, 2008, <http://www.sdn.sap.com/irj/scn/go/portal/prtroot/docs/library/uuid/80f23fae-d7e2-2a10-34b5-f049d65d34d6?QuickLink=index&overridelayout=true>, site visited Nov. 17, 2011, 7 pages.

* cited by examiner

*Primary Examiner* — Sujay Koneru
(74) *Attorney, Agent, or Firm* — Fish & Richardson P.C.

(57) ABSTRACT

The present disclosure describes methods, systems, and computer program products for managing an information technology (IT) solution center. One method includes determining a list of priorities about activities based on a set of properties related to the activities, optimizing the activities based on the list of priorities, and assigning the optimized activities with correlated actions. The correlated actions can include at least one of (i) appointing one or more entries of the activities to customer relationship management and (ii) transferring one or more entries of the activities to a notification user interface. The method may further include maintaining a database associated with an industry IT solution center, wherein the database includes the activities and the set of properties related to the activities, and displaying issues, technical incidents, and alerts grouped according to a set of definitions.

6 Claims, 3 Drawing Sheets

MANAGING INFORMATION TECHNOLOGY SOLUTION CENTERS

TECHNICAL FIELD

The present disclosure relates to software, computer systems, and computer-implemented methods for managing information technology (IT) solution centers.

BACKGROUND

In many instances, an IT solution center may be a service provider for external customers and/or a company internal service provider within large customers. The IT solution center may provide a single location for various services. Users (e.g., customers, administrators, etc.) may obtain information regarding services, help, instruction, and purchase information. For example, the IT solution center may provide information about audio/visual equipment due dates, hardware and software sales, IT training opportunities, computer and printer recycling, computer repair, telephones, and other information.

SUMMARY

The present disclosure describes methods, systems, and computer program products for managing IT solution centers. The disclosed methods, systems and computer program products can provide efficient services as well as prioritize issues for avoiding unnecessary cost at IT solution centers. One example method includes determining a list of priorities about activities based on a set of properties related to the activities, optimizing the activities based on the list of priorities, and assigning the optimized activities with correlated actions. The correlated actions can include at least one of (i) appointing one or more entries of the activities to customer relationship management and (ii) transferring one or more entries of the activities to a notification user interface. The method may further include maintaining a database associated with an industry IT solution center, wherein the database includes the activities and the set of properties related to the activities, and displaying issues, technical incidents, and alerts grouped according to a set of definitions.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally relates to software, computer systems, and computer-implemented methods for managing IT solution centers that can provide service to external customers, as well as internal service within a large customer. A customizable dashboard, or work center, may be provided for the IT solution centers to reduce total cost of ownership (TCO) via optimizing various aspects of business and daily work. The present disclosure describes an IT solution center management platform/server that provides such service. This is based on the linkage between business data from an enterprise resource planning (ERP) system that includes information about customers, service level agreements (SLAs), contracts, etc., and associated technical data (e.g., systems, hosts, issues, incidents, alerts, etc.). The technical data may come from technical IT processes, for example, those handled by a solution manager and/or third-party IT tools. With such linkage, information may be used to prioritize entries presented in the IT solution centers and therefore be managed based on assigned or determined priorities.

Figure 1:
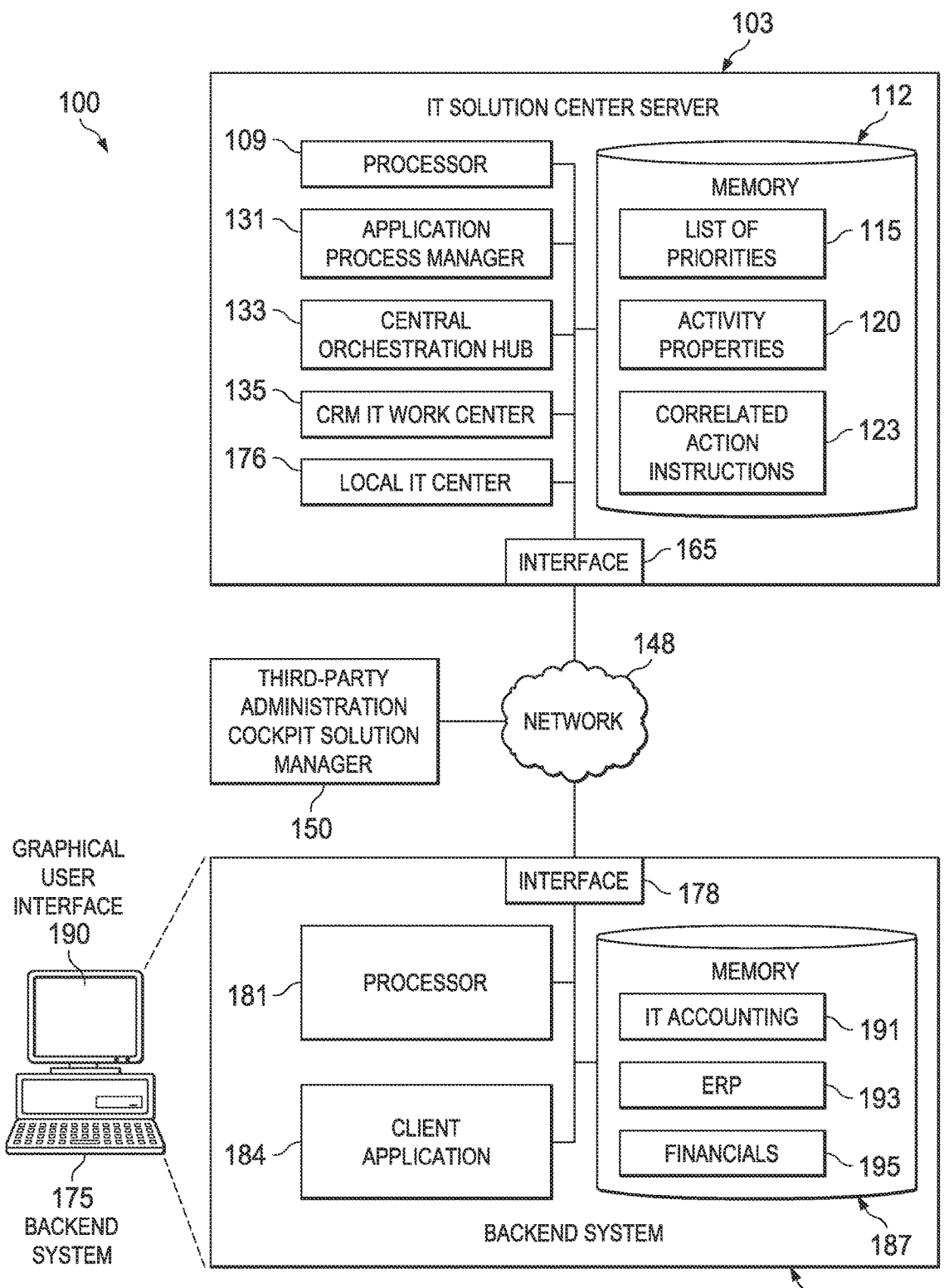
FIG. 1 illustrates an example environment for implementing various features of an IT solution center server.

FIG. 1 illustrates an example environment 100 for implementing various features of a system providing IT solution centers management. The illustrated environment 100 includes, or is communicably coupled with, an IT solution center server 103, at least one backend system 175, and a third party administration cockpit—solution manager 150 (hereafter, "third party administration cockpit 150"). At least some of the communications between the IT solution center server 103, the backend system 175, and the third party administration cockpit 150 may be performed across or via network 148. In general, environment 100 depicts an example configuration of a system for providing IT solution services to entities and/or objects with one or more preexisting entities or objects available in related systems, such as the IT solution center server 103 and the backend system 175. The environment 100 is an example, and in alternative implementations, the elements illustrated in FIG. 1 may be included in or associated with different and/or additional servers, clients, networks, and locations other than those as shown. For example, one or more of the components illustrated within the IT solution center server 103 may be located in multiple or different servers, cloud-based networks, or other locations accessible to the IT solution center server 103 (e.g., either directly or indirectly via network 148).

In general, the IT solution center server 103 is any server or system that stores, manages, and executes functionality associated with an application process manager 131, a central orchestration hub 133, a custom relationship management (CRM) IT work center 135, and a local IT center 137. For example, each IT solution center server 103 may be a Java™ 2 Platform, Enterprise Edition (J2EE™)-compliant application server that includes Java technologies such as Enterprise JavaBeans™ (EJB), J2EE™ Connector Architecture (JCA), Java™ Messaging Service (JMS), Java™ Naming and Directory Interface (JNDI), and Java™ Database Connectivity (JDBC). In some instances, each IT solution center server 103 may store a plurality of various applications, while in other instances, IT solution center servers 103 may be dedicated servers meant to provide IT solution center management capabilities for the backend systems 175 and the third party administration cockpit 150, and only include applications and functionality associated with that purpose. In some instances, the IT solution center server 103 may comprise a web server or be communicably coupled with a web server, where one or more of the application process manager 131 associated with the IT solution center server 103 represent web-based (or web-accessible) applications accessed and executed through requests and interactions received on the backend system 175, executing a client application 184 operable to interact with the programmed tasks and/or an application process manager 131.

At a high level, the IT solution center server 103 comprises an electronic computing device operable to receive, transmit, process, store, or manage data and information associated with the environment 100. The IT solution center server 103 illustrated in FIG. 1 can be responsible for receiving application-related requests from one or more backend systems 175 (as well as any other entity or system interacting with the IT solution center server 103, including desktop or mobile client systems), responding to the received requests by processing said requests in the associated application process manager 131, and sending the appropriate responses from the appropriate component back to the requesting backend system 175 or other requesting system. Components of the IT solution center server 103 can also process and respond to local requests from a user locally accessing the IT solution center server 103. Accordingly, in addition to requests from the backend system 175, requests associated with a particular component may also be sent from internal users, external or third-party customers, and other associated business applications, business processes, as well as any other appropriate entities, individuals, systems, or computers, including the third part administration cockpit 150. In some instances, the application process manager 131 may be web-based applications executing functionality associated with a networked or cloud-based business process.

As used in the present disclosure, the term "computer" is intended to encompass any suitable processing device. For example, although FIG. 1 illustrates a single IT solution center server 103, environment 100 can be implemented using any number of servers, as well as computers other than servers, including a server pool. Indeed, the IT solution center server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated IT solution center server 103 may be adapted to execute any operating system, including Linux, UNIX, Windows, Mac OS, IOS, or any other suitable operating system.

In the illustrated implementation of FIG. 1, the IT solution center server 103 includes an interface 106, a processor 109, a memory 112, an application process manager 131, a central orchestration hub 133, CRM IT work center 135, and a local IT center 137. In some instances, the IT solution center server 103 and its illustrated components may be separated into multiple components executing at different servers and/or systems. For example, while FIG. 1 illustrates the application process manager 131 and the central orchestration hub 133 as separate components, other example implementations can include the central orchestration hub 133 within a separate system. Thus, while illustrated as a single component in the example environment 100 of FIG. 1, alternative implementations may illustrate the IT solution center server 103 as comprising multiple parts or portions, accordingly.

FIG. 1 depicts a server-client environment, but could also represent a cloud computing network. Various other implementations of the illustrated environment 100 can be provided to allow for increased flexibility in the underlying system, including multiple IT solution center servers 103 performing or executing one or more additional or alternative instances of the central orchestration hub 133 and associated with a context/environment analyzer 133 for one or more different platforms, as well as multiple instances of the application process manager 131 and its related functionality. In those instances, the different IT solution center servers 103 may communicate with each other via a cloud-based network or through the connections provided by network 148.

The interface 106 is used by the IT solution center server 103 to communicate with other systems in a client-server or other distributed environment (including within environment 100) connected to the network 148 (e.g., one of the backend systems 175, as well as other systems communicably coupled to the network 148). The interface 106 generally comprises logic encoded in software and/or hardware in a suitable combination and operable to communicate with the network 148. More specifically, the interface 106 may comprise software supporting one or more communication protocols associated with communications such that the network 148 or the interface's hardware is operable to communicate physical signals within and outside of the illustrated environment 100.

In some implementations, the IT solution center server 103 may include a central IT dashboard. The central IT dashboard may enable users and remote systems such as the backend system 175 and the third party administration cockpit 150 to transfer from CRM with contracts, orders, and SLA from the IT solution center server 103. The central IT dashboard may enable data transfer to CRM (such as the CRM IT work center 135 and the Local IT center 137) and the ERP 193. The central IT dashboard may enable data transfer from a third party technical environment such as Nagios or Openview for incidents, issues, and alerts, and may connect with the third party technical environment for system operation. The central IT dashboard may use central identification management (IDM) for user-specific orders and central process integration connectivity infrastructure to maintain connectivity. There may be other functionalities that the central IT dashboard can perform, for example, using the central business process management infrastructure and central application lifecycle management processes.

Generally, the IT solution center server 103 may be communicably coupled with a network 148 that facilitates wireless or wireline communications between the components of the environment 100 (i.e., between the IT solution center server 103 and the third party administration cockpit 150 and/or one or more backend systems 175), as well as with any other local or remote computer, such as additional clients, servers, or other devices communicably coupled to network 148, including those not illustrated in FIG. 1. In the illustrated environment, the network 148 is depicted as a single network, but may be comprised of more than one network without departing from the scope of this disclosure, so long as at least a portion of the network 148 may facilitate communications between senders and recipients. In some instances, one or more of the components associated with the IT solution center server 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can comprise either a wireline or wireless link. Example wireless links may include 802.11/b/g/n, 802.20, WiMax, and/or any other appropriate wireless link. In other words, the network 148 encompasses any internal or external network, networks, sub-network, or combination thereof operable to facilitate communications between various computing components inside and outside the illustrated environment 100. The network 148 may communicate, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the IT solution center server 103 includes a processor 109. Although illustrated as a single processor 109 in the IT solution center server 103, two or more processors may be used in the IT solution center server 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the IT solution center server 103 and, specifically, the functionality associated with the corresponding application process manager 131, the central orchestration hub 133 and the CRM IT work center 135. In one implementation, the server's processor 109 executes the functionality required to receive and respond to requests and instructions from the backend system 175 and third party administration cockpit 150, as well as the functionality required to perform the operations of the associated application process manager 131 and the central orchestration hub 133, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding central orchestration hub 133 and the application process manager 131 stored on the associated IT solution center server 103. In some instances, a particular IT solution center server 103 may be associated with the execution of two or more application process manager 131 (and other related components), as well as one or more distributed applications executing across two or more servers executing the functionality associated with the IT solution center server 103.

At a high level, each application process manager 131 is any application, program, module, process, or other software that may execute, change, delete, generate, or otherwise manage information associated with a particular IT solution center server 103, and in some cases, a business process performing and executing business process-related events. In particular, business processes communicate with other users, applications, systems, and components to send, receive, and process events. In some instances, a particular application process manager 131 may operate in response to and in connection with one or more requests received from an associated backend system 175 or other remote systems. Additionally, a particular application process manager 131 may operate in response to and/or in connection with one or more requests received from other application process manager 131 external to the IT solution center server 103. In some instances, the application process manager 131 may request additional processing or information from an external system or application. In some instances, the application process manager 131 may represent a web-based application accessed and be executed by remote backend systems 175 via the network 148 (e.g., through the Internet, or via one or more cloud-based services associated with the application process manager 131). Further, while illustrated as internal to the IT solution center server 103, one or more processes associated with a particular application process manager 131 may be stored, referenced, or executed remotely. For example, a portion of a particular application process manager 131 may be a web service that is remotely called, while another portion of the application process manager 131 may be an interface object or agent bundled for processing at a remote system (not illustrated), a particular solution manager, or a particular backend system 175 (e.g., the client application 184). Moreover, any or all of a particular application process manager 131 may be a child or sub-module of another software module or enterprise application (not illustrated) without departing from the scope of this disclosure. Still further, portions of the particular application process manager 131 may be executed or accessed by a user working directly at the IT solution center server 103, as well as remotely at a corresponding backend system 175.

The illustrated application process manager 131 may perform a number of functions in the IT solution center server 103. For example, the application process manager 131 can maintain customer data such as a master data set for the IT solution center server 103. The application process manager 131 may handle and present issues, technical incidents and alerts grouped by customer and corresponding service level agreement (SLA) status. The maintenance of the customer data and handling of issues may be performed via a user interface accessed from the network 148. The SLAs may include contracted delivery times of certain services or performances, and record a common understanding of services, priorities, responsibilities, guarantees, and warranties. The application process manager 131 may manage such information of the database of the IT solution center server 103.

In some implementations, the application process manager 131 may provide an administrator the ability to access and interact with the IT solution center server 103 or the third party administration cockpit 150 to manage issues, incidents, or alerts directly. For example, the administrator may obtain manual override of control via the application process manager 131 to modify and change automatic execution in the example environment 100, such as manually correcting database errors. Such intervention may be useful when erroneous information is recorded for the SLA, such as values for abandonment rate (ABA), average speed to answer (ASA), time service factor (TSF), first-call resolution (FCR), turn-around time (TAT), uptime, downtime, etc.

The central orchestration hub 133 may perform critical functions such as determining priorities of activities based on technical priorities and service level agreement with customers. For example, customers with larger service level agreements based remaining downtime may have lower priority. The service level agreement between provider and customer can define a maximum downtime. During the operation of the system, there may be some smaller downtimes, which add to the total downtime, where the total downtime should not exceed the SLA downtime. The time between the maximum downtime from the SLA and the total downtime is the remaining downtime. For example, the SLA for a first customer may include an agreed downtime of three (3) days per year, and may have previously used two days of downtime on general maintenance, leaving 1 day of downtime remaining under the SLA. In some cases, this 1 day of remaining downtime may equate to a medium priority. For a second customer with an SLA agreeing to 3 days of downtime per year, maintenance issues may have brought the current downtime for the year to 2.5 days, leaving the remaining downtime available at 0.5 days. This remaining downtime may be provided a high priority, such that all things being equal, the second customer's lesser remaining downtime may provide any such issues with priority over the first customer's higher remaining downtime. In general, SLAs may have several different levels. For instance, a customer-based SLA can cover all services an individual customer group uses. A service-based SLA may be an agreement for all customers using the services being delivered by the service provider. SLAs may also be split into various levels that each address different sets of customers for the same service as a multi-level SLA. There may be other types of SLAs for which the central orchestration hub 133 can determine priorities.

In some implementations, the central orchestration hub 133 may optimize incidents work by checking the SLA-relevance of issues. For example, grouping incidents work by the same SLA service-level objectives, such as these common metrics—ABA, ASA, TSF, FCT, TAT, etc. In some implementations, the central orchestration hub 133 may optimize local orders by checking SLA customer requirements, such as determining the priority order by required finishing date. The order of incoming issues can therefore be determined by weighing priorities to prevent penalties incurrence. In some implementations, the central orchestration hub 133 may optimize, for activities such as user management, connection activity management by using central orchestration tools (e.g., central ID-management, and/or central connectivity/PI hub, etc.).

The central orchestration hub 133 may use an ID management system that can include a variety of dimensions (such as fields, entries, or data, for example). For example, the ID management system may include a technical dimension, a legal dimension, a police dimension, a social and humanity dimension, a security dimension, an organization dimension, and others. The technical dimension may employ identification, implementation, administration and termination of identities with access to information systems. The legal dimension may include legislation for data protection. The police dimension may include activities preventing identity theft. The social and humanity dimension may include accessibility control of privacy issues. The security dimension may manage elements such as access control. The organization dimension may be related to defining hierarchies and divisions of access.

The CRM IT work center 135 may be a customer based work center used for monitoring SLAs for the specific customer. The monitoring process can be automated from issues and incidents optimized by in the central orchestration hub 133. The CRM IT work center 135 may be associated with a different CRM module that can manage interactions with customers, clients, and sales prospects. In a general aspect, CRM can organize, automate, and synchronize business processes with related modules. For example, the IT solution center server 103 may include a local IT center 137 that synchronizes with the CRM IT work center 135. The CRM work center 135 may automatically assign and store issues and correlated actions of the administrator to business data for usage in business processes such as customer history, monitoring activities, reporting billing, etc.

In some implementations, the CRM IT work center 135 may assign technical work to orders and/or contracts in the customer relationship management. This may be executed by the IT solution center server 103, and/or an operator/user. The CRM IT work center 135 may automatically transfer work to a financial module 195 to create bills depending on contract. The local IT center 137 may process and execute similar objectives for entries and activities provided within the IT solution center server 103.

In some implementations, activities may be triggered as new clients, systems, connections, and/or users, etc., based on orders coming of the ERP system 193 stored in the memory 187. The ERP system 193 may integrate internal and external management information across the example environment 100, embracing finance/accounting, manufacturing, sales and service, customer relationship management, etc. The ERP system 193 may automate the activity with an integrated software application to facilitate the flow of information between all business functions inside the boundaries of the example environment 100 and manage the connections to outside stakeholders.

FIG. 1 further includes memory 112. The memory 112 of the IT solution center server 103 stores data and program instructions, as well as metadata associated with central orchestration hub 133. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, process contexts, repositories storing services local to the IT solution center server 103, and any other appropriate information including any parameters, variables, algorithms, instructions, rules, constraints, or references thereto associated with the purposes of the IT solution center server 103 and its functionality. In some implementations, including a cloud-based system, some or all of the memory 112 may be stored remote from the IT solution center server 103, and communicably coupled to the IT solution center server 103 for usage. Specifically, memory 112 can store a list of priorities 115, activity properties 120, and correlated action instructions 122. Some or all of the elements illustrated within memory 112 may be stored external to the memory 112.

The list of priorities 115 may be accessible by different modules within the IT solution center server 103, as well as by external sources such as the backend system 175 as shown in FIG. 1. The list of priorities 115 may contain various versions of its contents in history. The list of priorities 115 may be configured such that only a shared portion may be accessed by other modules, or by different level of users, administrators, and developers. Although in FIG. 1 only one list of priorities 115 is illustrated in the memory 112, a collection of more than one configuration databases may be stored in the memory 112.

The list of priorities 115 may include incidents optimization based on service level agreement issues. The list of priorities 115 may further include local orders optimization based on service level agreement requirements. The information contained in the list of priorities may be extracted from the CRM IT work center 135 and utilized by the central orchestration hub 133. The optimization process at the central orchestration hub 133 may be based on the list of priorities 115.

The activity properties 120 may be critical information from the CRM IT work center 135 and the local IT center 137, stored in the memory 112. The activity properties 120 may be used to determine the list of priorities 115. In some implementations, the activity properties 120 may be used for comparison and selection by the central orchestration hub 133 to optimize business activities. In one example, activities such as buying a new service, enhancing existing contracts, and extending existing contracts can be added. For customers currently buying new services from the service provider, the dealing incidents' priority may rise and will thus may be considered more quickly, where appropriate.

The correlated action instructions 122 may be used by the application process manager 131 to assign the optimized business activities with certain correlated actions, such as appointing one or more entries of the activities to CRM and transferring one or more entries of the activities to a notification user interface, such as GUI 190 of the backend system 175.

The illustrated environment 100 of FIG. 1 also includes one or more backend systems 175. Some of the additional backend systems 175 may be used to view the visual presentation of the application process manager 131 and related modules. Some of the additional backend systems 175 may be feeding issues to the IT solution center server 103. The backend systems 175 may be associated with a number of managed systems/network/hardware, a particular business application or development context. Each backend system 175 may be any computing device operable to connect to or communicate with at least one of the IT solution center server 103 using a wireline or wireless connection via the network 148, or another suitable communication means or channel. In general, each backend system 175 includes a processor 181, an interface 178, a client application 184, a graphical user interface (GUI) 190, and a memory 187. In general, the backend system 175 comprises an electronic computer device operable to receive, transmit, process, and store any appropriate data associated with the environment 100 of FIG. 1. It will be understood that there may be any number of backend systems 175 associated with, or external to, environment 100. For example, while illustrated environment 100 includes a single backend system 175, alternative implementations of environment 100 may include multiple clients communicably coupled to the one or more of the systems illustrated. In some instances, one or more backend systems 175 may be associated with administrators of the environment, and may be capable of accessing and interacting with the settings and operations of the central orchestration hub 133, one or more application process manager 131, and/or other components of the illustrated environment 100. Additionally, there may also be one or more additional backend systems 175 external to the illustrated portion of environment 100 capable of interacting with the environment 100 via the network 148. Moreover, while each backend system 175 is described in terms of being used by a single user, this disclosure contemplates that many users may use one computer, or that one user may use multiple computers.

The GUI 190 associated with each backend system 175 may comprise a graphical user interface operable to, for example, allow the user of a backend system 175 to interface with at least a portion of the application process manager 131, central orchestration hub 133, CRM IT work center 135, and/or their associated operations and functionality. Generally, the GUI 190 provides the particular user with an efficient and user-friendly presentation of business data provided by or communicated within the system. The GUI 190 may comprise a plurality of customizable frames or views having interactive fields, pull-down lists, and buttons operated by the user. For example, the GUI 190 may provide interactive elements that allow a user to interact with a particular component within and/or external to environment 100. Different portions of the corresponding component's functionality may be presented and accessible to the user through the GUI 190, such as through a client application 184 (e.g., a web browser). Generally, the GUI 190 may also provide general interactive elements that allow a user to access and utilize various services and functions of a particular component. In some instances, the client application 184 may be used to access various portions of the IT solution center server 103. In some instances, the client application 184 may be an agent or client-side version of the application process manager 131 or other suitable component. The GUI 190 may present the information of the client application 184 for viewing and interaction. In general, the GUI 190 is often configurable, supports a combination of tables and graphs (bar, line, pie, status dials, etc.), and is able to build real-time portals, where tabs are delineated by key characteristics (e.g., site or micro-site). Therefore, the GUI 190 contemplates any suitable graphical user interface, such as a combination of a generic web browser, intelligent engine, and command line interface (CLI) that processes information in the platform and efficiently presents the results to the user visually.

The memory 187 may include an IT accounting module 191, an ERP module 193, and a financial module 195. The IT accounting module 191 may include local database for accounting and the data may be transferred to the IT solution center server 103 via the network 148 and the interface 106 to be processed by the CRM IT work center and the central orchestration hub 133. The ERP module 193 may be an integrated system that operates in real time or similar without relying on periodic updates. The ERP module 193 may have a common database that supports all applications within the example environment 100. The ERP module 193 may include a consistent user interface. For example, the ERP module 193 may include databases for finance/accounting, human resources, manufacturing, supply chain management, project management, customer relationship management, data services, access control, and other categories. The financial module 195 may include a dedicated database for financial information as part of the ERP 193;

but the financial module 195 may also be an individual module independent from the ERP 193 in case ERP 193 is not included.

As used in this disclosure, each backend system 175 is intended to encompass a personal computer, touch screen terminal, workstation, network computer, kiosk, wireless data port, smart phone, personal data assistant (PDA), one or more processors within these or other devices, or any other suitable processing device. For example, each backend system 175 may comprise a computer that includes an input device, such as a keypad, touch screen, mouse, or other device that can accept user information, and an output device that conveys information associated with the operation of one or more application process manager 131 central orchestration hub 133, and/or the backend system 175 itself, including digital data, visual information, or the GUI 190. Both the input and output device may include fixed or removable storage media such as a magnetic storage media, CD-ROM, or other suitable media, to both receive input from and provide output to users of backend system 175 through the display, namely, the GUI 190. The client's processor 181, interface 178, and memory 187 may be similar to or different from those described in connection with the other components illustrated in FIG. 1, although alternative implementations of one or more of these components may be used, as well as implementations where additional components may also be included.

The third party administration cockpit 150 may include a third party solution manager such as a proprietary solution manager, a service provider cockpit, Openview, Tivoli, Nagios, or other solution managers. The third party administration cockpit 150 enables access to the IT solution center server 103 as well as different systems under IT management, such as different networks and hardware. For example, the third party administration cockpit 150 may include a proprietary solution manager, a proprietary service provider cockpit, Openview, or any other suitable application or system. Openview can provide large-scale system and network management of an organization's IT infrastructure, including optional modules from HP as well as third-party management software. The optional modules may be connected within a common framework and communicated with one another.

Figure 2:
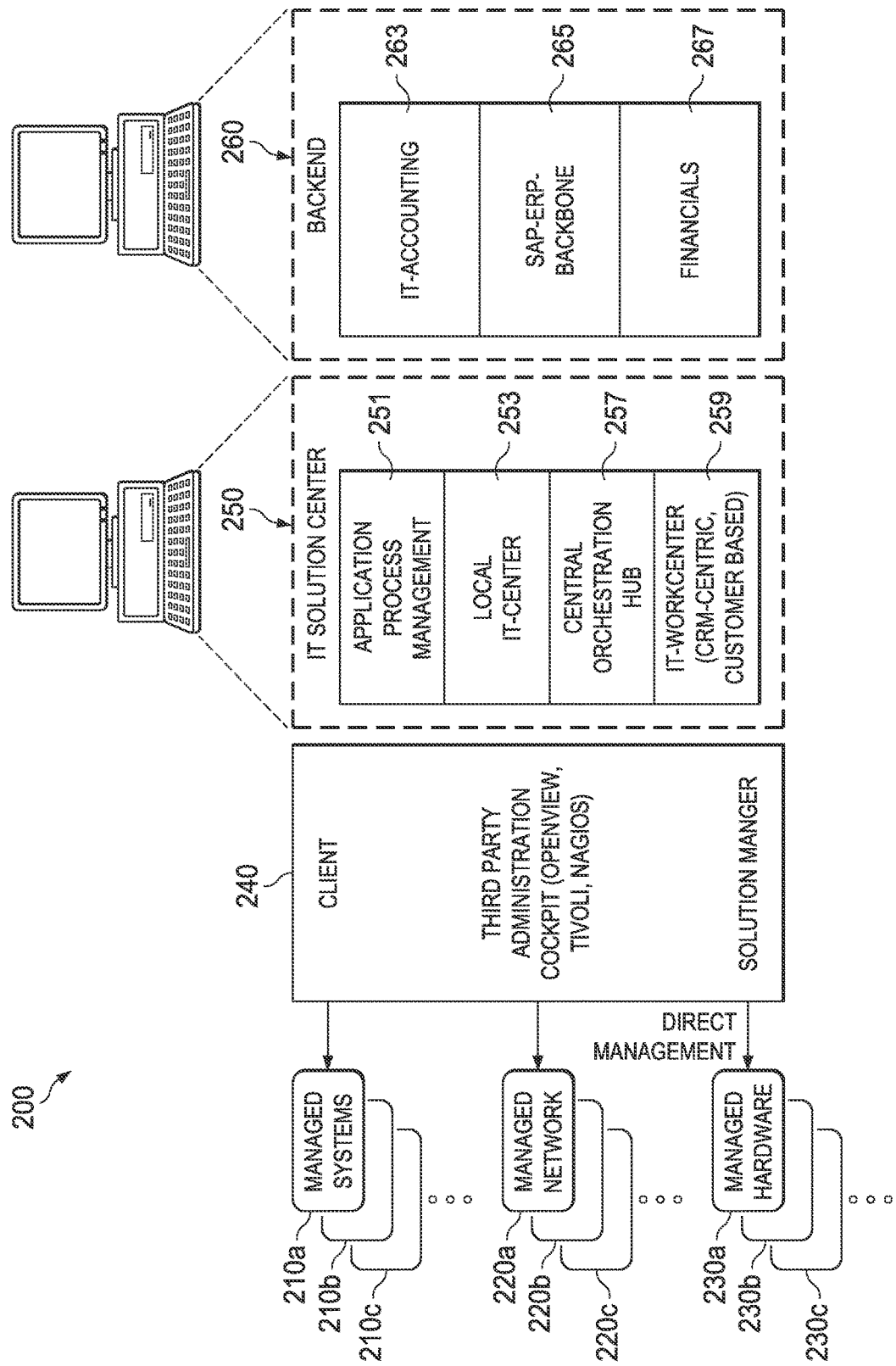
FIG. 2 provides an example architecture of an IT solution center management system.

FIG. 2 provides an example architecture of an IT solution center management system 200. The IT solution center management system 200 may be used in an environment such as the example environment 100 shown in FIG. 1. The IT solution center management system 200 can include a third party cockpit 240, an IT solution center 250, and a backend 260. The third party cockpit 240 may exchange information with the IT solution center 250 for management information. The IT solution center 250 may obtain activity and the related property information from the backend 260.

In some implementations, the third party cockpit 240 may be a third party administration cockpit, for example, Openview, Tivoli, Nagios, etc. The third party cockpit 240 may be similar to the third party administration cockpit 150 as shown in FIG. 1. The third party cockpit 240 may operate as a solution manager, where users may gain access via a unified user interface to some or all of the related managed systems 210, managed networks 220, managed hardware 230, and the IT solution center 250. The third party cockpit 240 may execute a systems management platform, such as Tivoli from IBM. The third party cockpit 240 can be an architecture that allows the platform to manage large numbers of remote locations or devices. The third party cockpit 240 may also execute Nagios, or any other suitable proprietary and/or open source computer system and network monitoring software application for monitoring hosts and services and alerting users when issues occur, as well as when issues are resolved.

The third party cockpit 240 may connect multiple related systems 210, network 220, and hardware 230 for collaboration. The third party cockpit 240 may perform as a solution manager collaborating with third party administration tools. At the third party cockpit 240, operations may be performed for third party incident management and help desk (for example, via solution manager, as part of the third party cockpit 240). In some embodiments, the third party cockpit 240 may include incident management, business process repository, solution documentation, technical monitoring, and other core functions. The third party cockpit 240 may also provide CRM functions and financials operations for automated billing via the IT solution center 250.

The IT solution center 250 may be physically and/or virtually similar to the IT solution center server 103 as shown in FIG. 1. The IT solution center 250 may include or be associated with an application process management 251, a central orchestration hub 257, an IT work center 259, and a local IT center 253. The application process management 251 may provide functions similar to the application process manager 131 in FIG. 1. For example, the application process management 251 can maintain customer data such has a master data set. The application process management 251 may show and handle issues, technical incidents, and alerts grouped by customer and corresponding SLA status. The maintenance of the customer data and handling of issues may be performed via the IT solution center accessed from the third party cockpit 240. The SLA may include contracted delivery times of certain services or performances, and record a common understanding of services, priorities, responsibilities, guarantees, and warranties.

In some implementations, the application process management 251 may provide the capability for an administrator to access and interact with the IT solution center 250 or the third party cockpit 240 to manage issues, incidents, or alerts directly. For example, the administrator may obtain manual override of control via the application process management 251 to modify and change automatic execution, such as manually correcting database errors. Such intervention may be useful when erroneous information is recorded for the SLA, such as values for abandonment rate (ABA), average speed to answer (ASA), time service factor (TSF), first-call resolution (FCR), turn-around time (TAT), uptime, downtime, etc.

The central orchestration hub 257 may organize, optimize, and prioritize managed data, similar to the function of the central orchestration hub 133 in FIG. 1. The IT work center 259 may include CRM-centric, customer based database and perform operations similar to the CRM IT work center 135 in FIG. 1.

The backend 260 may provide activity and the related property information to the IT solution center 250. The backend 260 may include an IT accounting module 263, an ERP backbone 265, and the financial database 267. The IT accounting module 263 may include local database for accounting and the data may be transferred to the IT solution center 250 and processed by the IT work center 259 and the central orchestration hub 257. The ERP backbone 265 may integrate internal and external management information, embracing finance/accounting, manufacturing, sales and service, customer relationship management, etc. The ERP backbone 265 may automate the activity with an integrated software application to facilitate the flow of information between all related business functions and manage the connections to outside stakeholders.

The ERP backbone 265 may be an integrated system that operates in real time or similar without relying on periodic updates. The ERP backbone 265 may have a common database that supports all applications within the example environment 100. The ERP backbone 265 may include a consistent user interface. For example, the ERP backbone 265 may include databases for finance/accounting, human resources, manufacturing, supply chain management, project management, customer relationship management, data services, access control, and other categories. The financial module 267 may include a dedicated database for financial information as part of the ERP backbone 265; but the financial module 267 may also be an individual module independent from the ERP backbone 265 in case it is not included.

In some implementations, the IT solution center 250 may receive solution request for technical issues from an administrator of a system. The technical issues may be automatically reported by a third party administration tool from the third party cockpit 240, such as Openview and other suitable solution management providers. These third party administration tools may be related to hardware used by different customers. The third party cockpit 240 may include a technical database (e.g., a lifecycle management database) for retrieving information related to hardware use by customers. The CRM at the IT work center 259 of the IT solution center may include knowledge about related SLAs if the IT solution center 250 is under contract with the requesting customer. The SLA may differ among customers. In case of a system downtime, for example, the total downtime per year may be limited to 2 days. For one customer, this allowed downtime may be used to 90% already while for another customer, this downtime may be unused.

The system administrator should work on the issue of the first customer to prevent penalties, because an additional downtime may extend violate the SLA. In conventional IT solution centers, this type of management tactics may not be visible to the administrator, leading potential penalty problems. The solution provided by the IT solution center, by prioritizing entries based on their properties, can show the administrator all related information including the remaining downtime and prioritize issues from the first customer and therefore prevent potential penalties.

In some implementations, the IT solution center 250 may help a system administrator for provisioning of hardware and software, both of which are ordered by customers. In such a scenario, each order is recorded in the CRM of the IT work center 259 and/or the local IT center 253. The orders may only be executed in the hardware or software center by the administrator. The technical work may be a reconfiguration of existing resources (e.g, completed in administration tools such as a cloud manger, Openview, etc.), software configuration (e.g., accomplished in Solman or a proprietary service provider cockpit), software installation (done via administration tools, SPC, manual work) or installation of new hardware.

In this scenario, the IT solution center 250 may present the work items via a user interface, separate the work items into technical steps, set and apply a weight to various issues, depending on SLA and contract data of the customer and employ different tools. After execution of the task, the IT solution center 250 may send the order confirmation to the customer to get the final confirmation (change management process) and send it to financials for the billing.

In some implementations, the orders of a customer and the issues related to a customer are business relevant for a number of purposes. For example, SLA fulfillment may be desired and penalties may be prevented. Another purpose would be to have orders be fulfilled. One other purpose may be customer satisfaction, leading to abilities to sell additional services. Based on the automated CRM in the IT solution center 250, the IT solution center 250 may write all related issues, incidents, and orders, together with its response time to the CRM and may help the sales person to communicate with the customer and server customers' needs. In addition, the IT solution center 250 may write order fulfillments to the financials (e.g., the financial module 267) to create automated bills.

Figure 3:
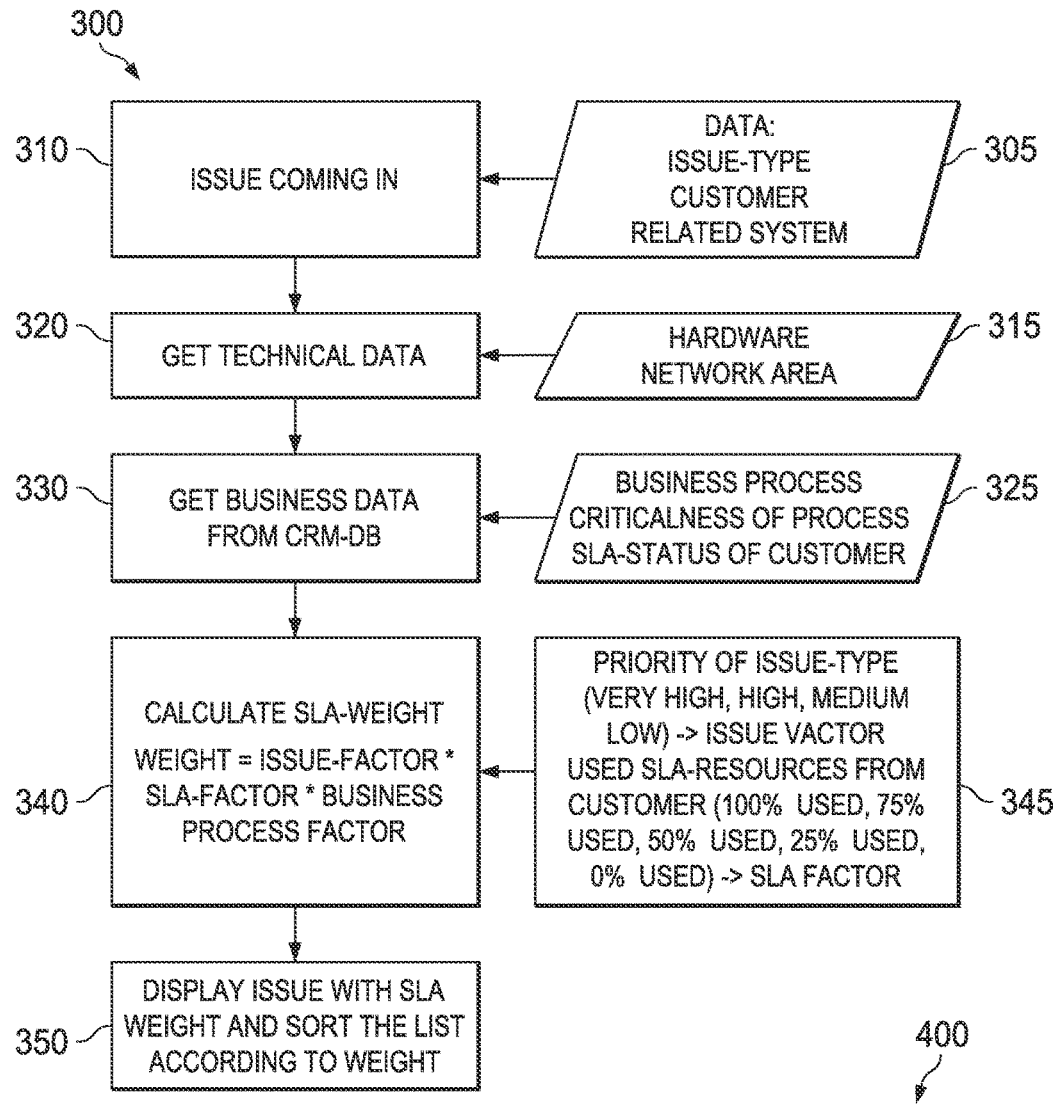
FIG. 3 illustrates an example information flow schematics in accordance with the present disclosure.

FIG. 3 illustrates an example information flow schematics 300 in accordance with the present disclosure. The information flow schematics 300 may be executed in an environment similar to the example environment 100 shown in FIG. 1. At 305, data may first be generated at an issue-type customer related system. At 310, an IT solution center receives the issue. At 320, the received issue is forwarded to 320 where further technical data is received, for example, from hardware and network areas at 315.

At 330, business data is obtained from a CRM database. For example, the data may relate to business processes, criticalness of business processes, and an SLA status of customer at 325. The business data from the CRM database can then be calculated into an SLA weight that considers the issue factor, an? SLA factor, and a business process factor at 340. Some of the calculation performed at 340 may include property indicators, such as priority of issue type (e.g., very high, high, medium, low), and used SLA-resources from a customer (e.g., 100% used, 75% used, 50% used, 25% used, 0% used). The calculated weight at 340 can then be used to sort the list of issue at 350, showing users with a sorted list that reflects issue priority.

Figure 4:
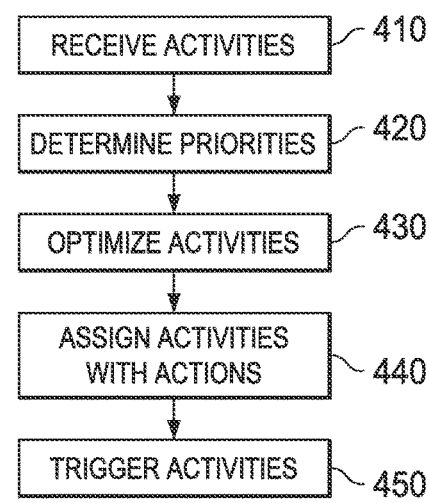
FIG. 4 illustrates an example method in accordance with the present disclosure.

FIG. 4 illustrates an example method 400 in accordance with the present disclosure. At 410, an IT solution center may receive a list of activities that each is associated with a set of properties. The set of properties may depend on the SLA agreement, and can be defined via the contract for each customer or by a a customized settings for groups of customers. At 420, the priorities of the activities are determined based on incidents optimization related to SLA issues and local orders optimization based on SLA requirements. At 430, the list of priorities is used to optimize the list of activities. For example, the set of properties of the activities may include customer instructions and service level agreement status. Such information can be used to calculate weight of activities and sort the activities based on the calculated weight. In some implementations, the optimization of the activities at 430 may use central orchestration tools, such as central identification management and central connectivity hub.

At 440, the optimized activities are assigned with correlated actions. The correlated actions may include one or more of the following, as well as other suitable correlated actions: appointing one or more entries of the activities to customer relationship management and transferring one or more entries of the activities to a notification user interface. The notification interface may be presented to a solution manager as well as to an IT solution center. The optimized activities may be assigned with technical work to orders, contracts, or both in a customer relationship management system. The optimized activities may also transfer work to a financial management system for creating bills. At 450, the list of activities may be triggered as new entries, basing on orders received from an ERP system.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for managing an information technology (IT) solution center, the method comprising:

receiving, by at least one computer processor, a plurality of activities to be implemented by an information technology (IT) solution center associated with provisioning of hardware and software resources including at least one of a reconfiguration of existing hardware or software resources, installation or configuration or new software, or installation of new hardware, the plurality of activities received from a plurality of customers, wherein the IT solution center maintains a respective service level agreement (SLA) with each of the plurality of customers, and wherein each customer's SLA specifies a maximum downtime wherein customer hardware or software systems are unavailable for use by the customer and/or the customer's customers;

calculating, by at least one computer processor, for each of the plurality of customers, a list of remaining downtimes, each remaining downtime based on each customer's maximum downtime specified in each customer's SLA and each customer's total downtime that each customer has previously experienced;

optimizing, by at least one computer processor and via a central orchestration hub, the activities based on the list of calculated remaining downtimes and a determined priority of an issue type associated with the activity associated with provisioning the hardware and software, wherein optimizing the activities based on the list of calculated remaining downtimes and the priority of the issue type comprises prioritizing the activities based on a set of determined weighted values comprising a combination of the calculated remaining downtime of particular customers and the priority of the issue type associated with the activity, wherein activities received from a customer with a lower amount of remaining downtime are associated with a higher prioritization value relative to a customer with a relatively higher amount of remaining downtime; and assigning, by at least one computer processor, the optimized activities with correlated actions based on, the correlated actions including at least one of:
appointing, by at least one computer processor, one or more entries of the activities to customer relationship management; or
transferring, by at least one computer processor, one or more entries of the activities to a notification user interface.

2. The method of claim 1, wherein the list of remaining downtimes is included in a list of priorities which includes:
an incidents optimization based on service level agreement issues; and
a local orders optimization based on service level agreement requirements.

3. The method of claim 1, further comprising:
maintaining a database associated with an industry IT solution center, wherein the database includes the activities and the list of remaining downtimes; and
displaying issues, technical incidents, and alerts grouped according to a set of definitions.

4. The method of claim 3, wherein optimizing the activities further comprises optimizing the activities based on a set of properties which includes customer instructions and service level agreement status.

5. The method of claim 1, wherein assigning the optimized activities with correlated actions includes:
assigning technical work to orders, contracts, or both in a customer relationship management system; and
transferring work to a financial management system to create bills associated with the assigned technical work.

6. The method of claim 1, further comprising triggering the activities as new entries based on orders received from an enterprise resource planning system.

* * * * *